(12) United States Patent
Putra et al.

(10) Patent No.: US 9,344,235 B1
(45) Date of Patent: May 17, 2016

(54) NETWORK MANAGED VOLUMES

(75) Inventors: Roni J. Putra, Pompano Beach, FL (US); Nicholas Connolly, Purley (GB); Ye (Tom) Chen, Boca Raton, FL (US); David A. Linde, Plantation, FL (US); Ziya A. Aral, Pompano Beach, FL (US); Mohamed Ghanem, Coconut Creek, FL (US); Mark Friedman, Naples, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 1263 days.

(21) Appl. No.: 10/165,746

(22) Filed: Jun. 7, 2002

(51) Int. Cl.
*G06F 15/16* (2006.01)
*H04L 5/00* (2006.01)

(52) U.S. Cl.
CPC .................................... *H04L 5/0032* (2013.01)

(58) Field of Classification Search
CPC .. H04L 15/0035; H04L 12/2869; G06F 12/02
USPC ............ 711/202–208; 717/171–172; 709/219
See application file for complete search history.

(56) References Cited

U.S. PATENT DOCUMENTS

| | | | | | |
|---|---|---|---|---|---|
| 5,561,786 | A | * | 10/1996 | Morse | 711/170 |
| 5,704,055 | A | * | 12/1997 | George et al. | 711/2 |
| 5,983,316 | A | * | 11/1999 | Norwood | 711/112 |
| 6,119,208 | A | * | 9/2000 | White et al. | 711/162 |
| 6,233,623 | B1 | * | 5/2001 | Jeffords et al. | 719/316 |
| 6,240,498 | B1 | * | 5/2001 | Dickes et al. | 711/170 |
| 6,260,120 | B1 | * | 7/2001 | Blumenau et al. | 711/152 |
| 6,725,328 | B2 | * | 4/2004 | Kano et al. | 711/112 |
| 6,745,207 | B2 | * | 6/2004 | Reuter et al. | 707/200 |
| 6,799,260 | B1 | * | 9/2004 | Tunali et al. | 711/170 |
| 6,880,052 | B2 | * | 4/2005 | Lubbers et al. | 711/162 |
| 7,058,788 | B2 | * | 6/2006 | Niles et al. | 711/220 |
| 7,124,275 | B2 | * | 10/2006 | Gammel et al. | 711/203 |
| 7,290,259 | B2 | * | 10/2007 | Tanaka et al. | 718/1 |
| 7,941,598 | B2 | * | 5/2011 | Kaneda et al. | 711/112 |
| 2002/0019908 | A1 | * | 2/2002 | Reuter et al. | 711/112 |
| 2002/0019922 | A1 | * | 2/2002 | Reuter et al. | 711/206 |
| 2002/0049871 | A1 | * | 4/2002 | Iverson | 710/68 |
| 2002/0069369 | A1 | * | 6/2002 | Tremain | 713/201 |
| 2002/0103889 | A1 | * | 8/2002 | Markson et al. | 709/223 |
| 2002/0133491 | A1 | * | 9/2002 | Sim et al. | 707/10 |
| 2002/0161983 | A1 | * | 10/2002 | Milos et al. | 711/202 |
| 2002/0199040 | A1 | * | 12/2002 | Irwin et al. | 710/22 |

(Continued)

OTHER PUBLICATIONS

Milea, Andrei; "Dynamic Memory Allocation and Virtual Memory", http://www.cprogramming.com/tutorial/virtual_memory_and_heaps.html, Apr. 11, 2014.*

(Continued)

*Primary Examiner* — Jerry Dennison
(74) *Attorney, Agent, or Firm* — Michael Best & Friedrich LLP

(57) ABSTRACT

Disclosed are network managed volumes that enable simplified and more efficient use of information technology assets by allocating physical disk drives as needed. A pool of storage can be defined and populated with physical disks that are accessible in a storage area network. Virtual volumes are created from the storage pool, with each virtual volume being separately allocable to a host device (e.g., client, application server, etc.). Thus, host devices that have been allocated these virtual volumes perceive ownership of the entire volume, without requiring a present allocation of physical storage space having the same characteristics, but with seamless introduction of physical resources as needed.

21 Claims, 14 Drawing Sheets

(56) References Cited

U.S. PATENT DOCUMENTS

| | | | |
|---|---|---|---|
| 2003/0037060 A1* | 2/2003 | Kuehnel | 707/103 R |
| 2003/0131182 A1* | 7/2003 | Kumar et al. | 711/5 |
| 2003/0135609 A1* | 7/2003 | Carlson et al. | 709/224 |
| 2003/0135709 A1* | 7/2003 | Niles et al. | 711/220 |
| 2003/0140179 A1* | 7/2003 | Wilt et al. | 709/321 |
| 2003/0145251 A1* | 7/2003 | Cantrill | 714/35 |
| 2003/0172149 A1* | 9/2003 | Edsall et al. | 709/224 |
| 2003/0225970 A1* | 12/2003 | Hashemi | 711/114 |
| 2004/0162958 A1* | 8/2004 | Kano et al. | 711/170 |
| 2004/0205380 A1* | 10/2004 | Black | 714/5 |
| 2005/0034136 A1* | 2/2005 | Engstrom et al. | 719/328 |
| 2005/0120177 A1* | 6/2005 | Black | 711/114 |
| 2005/0265074 A1* | 12/2005 | Shoff et al. | 365/185.08 |
| 2006/0206494 A1* | 9/2006 | Ibrahim et al. | 707/10 |
| 2006/0247908 A1* | 11/2006 | Douceur et al. | 703/22 |
| 2006/0265529 A1* | 11/2006 | Kuik et al. | 710/62 |
| 2007/0038656 A1* | 2/2007 | Black | 707/100 |
| 2007/0256087 A1* | 11/2007 | Forin et al. | 719/332 |

OTHER PUBLICATIONS

Barb Goldworm, "Vendor Profile: FalconStor Aims to Provide a Complete Set of Storage Services." Storage Networking World Online (posted online Jul. 22. 2002). [retrieved on Jul. 22, 2002]. Retrieved from Internet: <URL: http://www.snwonline.comwhats_new/falcor_07-22-02.asp?s-2201.

\* cited by examiner

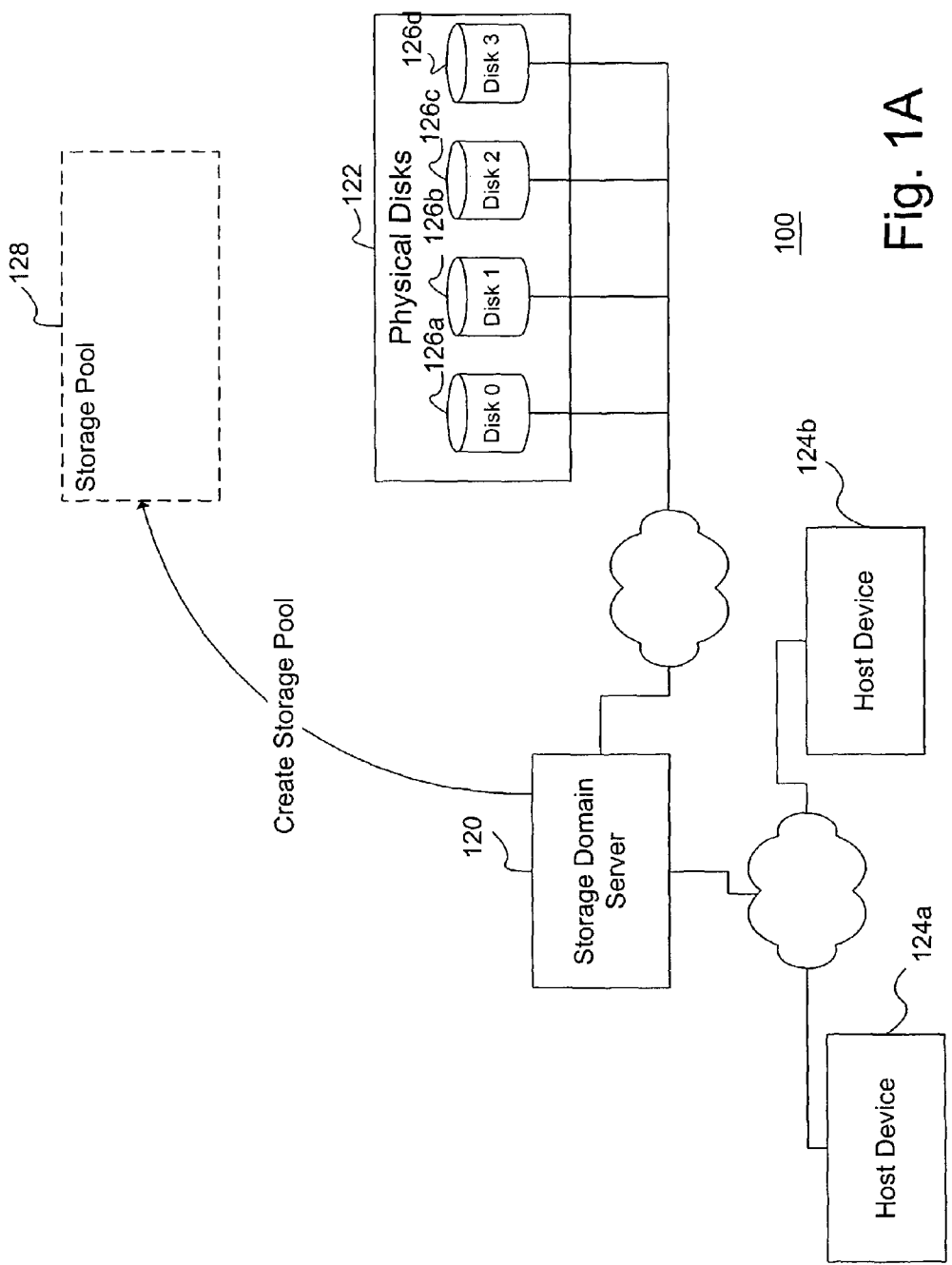

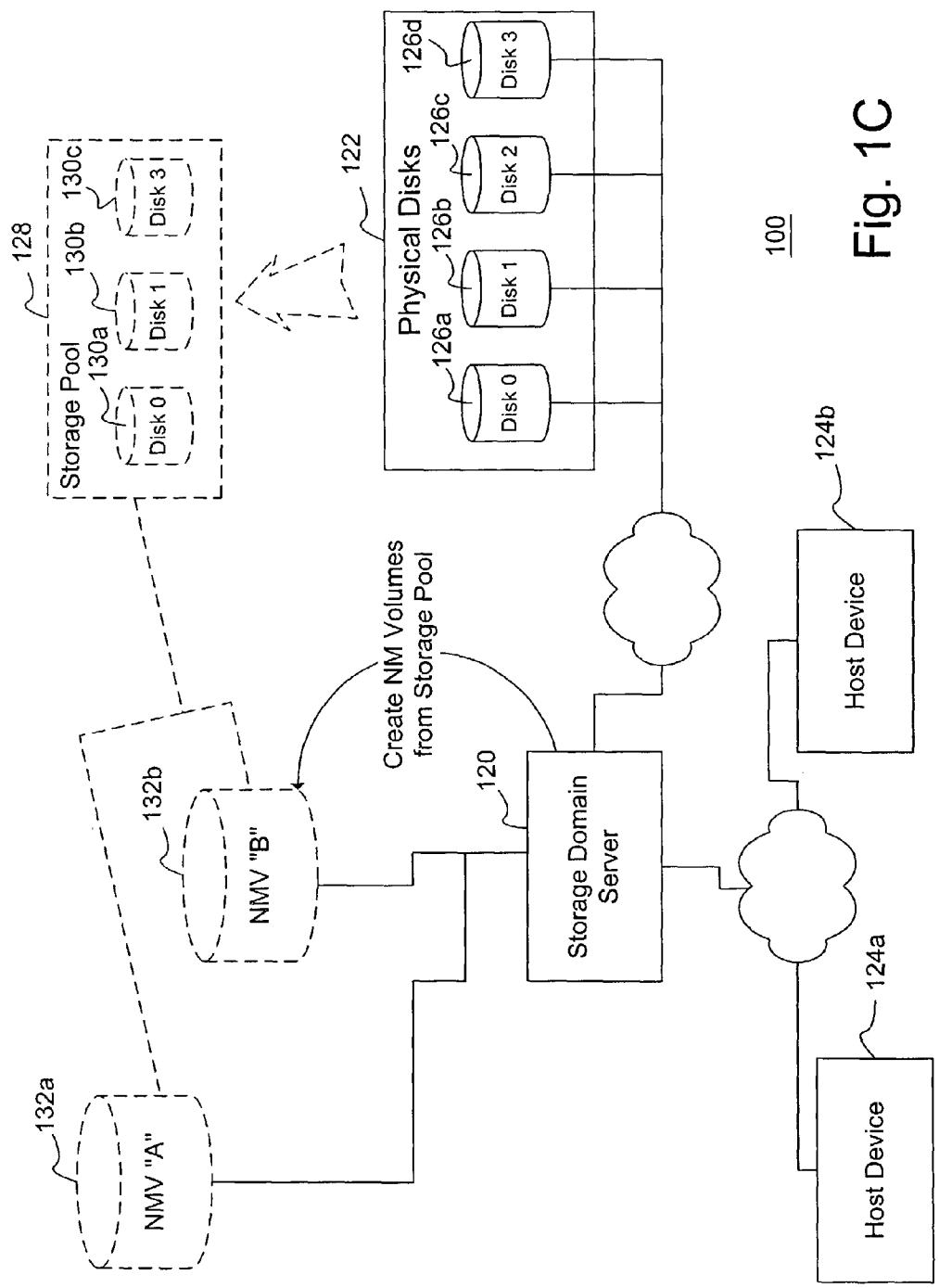

NETWORK MANAGED VOLUMES

BACKGROUND OF THE INVENTION

1. Field of the Invention

This invention relates generally to virtual storage, and more particularly to managing virtual volumes in a storage area network.

2. Description of the Related Art

One of the causes of poor asset use in an information technology setting is the fact that host operating systems expect to exclusively "own" devices attached to them. These operating systems jealously guard their storage, holding it captive to prevent other servers that have exhausted their capacity from tapping into available space on adjacent servers. As a result, organizations waste substantial portions of their investments buying more and more storage, creating a difficult environment to manage. Storage is also wasted because it is difficult or time-consuming to move storage devices between servers.

Some conventional systems provide "virtual local storage." These systems typically implement hard mappings or other mechanisms that appropriately route requests to access the remote storage device. The systems also implement access controls, which ensure that specified disks or partitions belong to assigned host devices. The "virtual" element in these systems is that physical disks are made to appear as though they are locally available to a host device. Although these systems purport to provide speed based advantages over traditional client server models that allow remote access to disks, they still have the problems identified above, as they merely provide another way to allocate physical storage to host devices on a piecemeal basis, whether the physical storage is whole disks or partitions of disks. For example, if an administrator has 100 units of physical disk space available, he might allocate 30 units to a first user, 30 units to a second user, and 40 units to a third user by creating a mapping that routes their respective client devices to the physical disk space. Thus, even with these systems, the allocations will be "jealously guarded" by the assigned client devices, and the allocation is limited by the sum of the individual storage allocations. Additionally, if a new allocation or reallocation is sought, the hard mappings must be updated and various procedures would be required to retain the integrity of the data stored by each user.

What is needed is a way to decrease the cost of storage devices, to maximize the usage of existent storage devices in a computer network, and to easily and effectively add storage devices without having to shut down the existing storage system.

SUMMARY OF THE INVENTION

The described embodiments of the present invention typically manage virtual volumes in a storage area network (SAN).

The network managed volumes of the present invention are virtual volumes that enable simplified and more efficient use of information technology assets by allocating physical disk drives as needed. Network managed volumes may also be referred to as virtual volumes, since they are a specific type of virtual volume. A pool of storage can be defined and populated with physical disks that are accessible in a storage area network. Network managed volumes (NMV) are created from the storage pool, with each NMV being separately allocable to a host device (e.g., client, application server, etc.). Thus, host devices that have been assigned these NMVs perceive ownership of the entire allocated volume, without requiring a present allocation of physical storage space having the same characteristics, but with seamless introduction of physical resources as needed.

In one embodiment, a SAN includes a Storage Domain Server (SDS) that interfaces with physical storage devices and host devices, and contains the network volume management functionality. The functionality allows the definition of a storage pool having a number of pool properties including a logical size, which represents the total amount of storage space corresponding to the pool. For example, a storage pool having a size of 2 terabytes could be defined. Once the pool is defined, physical storage devices to which the SDS is connected are placed in the pool. This provides allocable physical storage that can be used on demand by any NMV that is originated from the pool.

The physical storage devices could be of various types and sizes. One advantage of the present invention is that the physical storage devices that are placed into a storage pool do not need to add up to the size of the storage pool, even collectively. For example, a pool having a 2 terabyte logical size can be used to define several NMVs that are each 2 terabytes in size, even if the total amount of physical disk storage space assigned to that pool is less than 2 terabytes. Another advantage of the present invention is that multiple NMVs can be associated with the same storage pool, wherein each of the virtual volumes can be defined according to the logical size of the storage pool.

Still further, some embodiments of the present invention allow multiple storage domain servers to operate with multiple host devices, even if the NMVs used by the host devices share a common storage pool but use a different SDS. That is, a first host device could access a first NMV through a first SDS, and a second host device a second NMV through a second SDS, even if both virtual volumes are designated to the same storage pool.

The present invention dramatically increases storage capacity use by allowing large volumes to be created without immediately requiring any physical disk space. When a host device writes to an NMV in accordance with the present invention, chunks of physical storage are allocated from a pool on demand to meet the immediate need. The physical chunks are mapped to a chunk table for the storage pool, which allows coherent management of the virtual volume even with multiple NMVs, multiple physical storage devices, and/or multiple SDS.

In certain embodiments, a systems administrator or other user is notified of the pending need for more physical storage via alarms and event log messages. When the available physical resources from the physical disk pool deplete more than a predetermined amount and/or at more than a predetermined rate, the systems administrator receives a message that the physical disk pool is becoming depleted. If the systems administrator fails to add physical storage at this time, he may next receive a message informing him that a storage access failed because the pool was empty. At this point, the systems administrator can then add more physical storage to resolve the problem before a fault occurs.

The host device does not need to necessarily be concerned with the type of physical storage devices that are actually managed by the SAN, as the SDS merely presents a virtual volume to the host device. Particularly, the host device accesses the virtual volume for I/O operations as though, for example, it were a Fibre Channel (FC) storage device having the virtual volume properties. This is advantageous in that it simplifies access, and also because it allows use of existing "legacy" storage assets without requiring host devices to have any knowledge or capability of directly operating with the storage assets.

Finally, updates and reassignments of storage space are simplified by the present invention. Some embodiments provide a drag and drop Graphical User Interface (GUI). The user can simply add more storage with a mouse click. Moreover, the user does not have to shut down the system to add more storage.

BRIEF DESCRIPTION OF THE DRAWINGS

These and other more detailed and specific features of the present invention are more fully disclosed in the following specification, reference being had to the accompanying drawings, in which:

FIGS. 1A-1C are schematic diagrams illustrating a SAN and certain aspects of virtual volume management in accordance with the present invention.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

FIG. 1 is a schematic diagram illustrating a storage area network (SAN) 100 that includes a storage domain server (SDS) 120, which interfaces with a plurality of physical disks 122 and a plurality of host devices 124a, 124b. The physical disks 124 are referenced collectively for ease of discussion, but actually include multiple individual disks 126a-d. Each disk can be any conventional storage device, such as a magnetic hard disk. They may be separate single storage devices, groups of storage devices, commonly housed disk arrays, or various combinations thereof. Additionally, various protocols can be used to interface the SDS and physical disks 122. Examples include Fibre Channel (FC), SCSI, TCP/IP, or combinations thereof. Note that magnetic hard disks are just one of the types of physical storage devices to which the SAN can interface in accordance with the present invention. The physical devices can also include optical, magneto-optical and others types, alone or in various combinations. The illustration and use of the term disks is merely used for ease of discussion, as is the indication that the disks reside together in what appears as a physical disks location. The disks can be of various types in various separate locations, and can be interfaced with various different communications protocols if desired.

The SDS 120 can also communicate with the host devices 124a, 124b through various types of connections. An FC connection is preferred, but others including but not limited to a TCP/IP connection can also be provided.

Regardless of what is found in physical storage space, the SDS presents virtual volumes to host devices, which perceive the volumes as actual disks (the virtual volume may also be referred to as a virtual disk). Even write and read operations are conducted with the NMVs from the perspective of the host devices. Preferably, NMVs are defined according to storage pools that are previously defined by the SDS. FIG. 1A depicts the creation of a storage pool 128. This is a schematic diagram that illustrates the storage pool conceptually. The storage pool is not a separate physical entity, but is a logical unit that is managed and found in the SDS, so it is shown in dotted lines. The storage pool properties are preferably defined and/or displayed using GUI based tools.

Figure 10A:
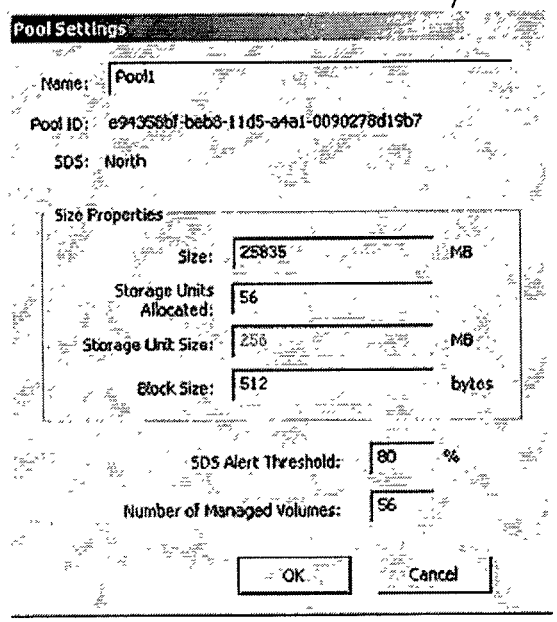
FIGS. 10A-10C are display diagrams illustrating a user interface for displaying storage pool settings and network managed volume information in accordance with the present invention.

Referring to FIG. 1A along with the pool settings screen 1002 of FIG. 10A, the storage pool properties can include "storage pool name," "storage pool identifier," "managing SDS," and size properties including "size," "allocated storage units," "storage unit size," and "block size." The properties also include an "SDS alert threshold" and "number of managed volumes." The storage pool name is a unique alphanumeric name given or assigned to each defined storage pool. Automatic sequential naming can be implemented ("Pool 1," "Pool 2," etc.). The storage pool identifier is a number that uniquely identifies each storage pool, and can be a Universal Unique Identifier (UUID) or another type of unique number. The managing SDS is the name of the SDS that contains or manages the storage pool, and can be any type of alphanumeric or other label.

Among the size properties, the "Size" is the size of the storage pool, which can be displayed in megabytes (MB) or the like. This will also be the default size of all NMVs that are created from this storage pool. Various sizes may be provided, with an upper limitation typically being governed by the system limitations (e.g., limitations of the operating system and/or interconnect medium protocol, etc.). Specifically, a 32 bit system has a two terabyte limit as such allows addressing of $2^{32}-1$ sectors of size 512 bytes. In one embodiment, the operating system is Windows 2000 provided by Microsoft Corp. of Redmond, Wash., and the default and limit size is 2 terabytes.

Continuing in the discussion of size properties, the "storage units allocated" is the amount of used storage in the pool, which can also be displayed in megabytes or the like. The "storage unit size" is the number of megabytes the pool will increase when modified, which is also referred to as the chunk size elsewhere herein. It may be variously set, such as the indicated 256, or a default 128, etc. The "block size" is the block size of the pool. The block size is the basic level used for read and write operations to the NMV by client devices. The SDS Alert Threshold is the point, represented as a percentage of storage used in the pool, that a low disk space storage alert will be issued (typically on a per SDS basis). Finally, "number of managed volumes" is the number of managed (virtual) volumes contained in the pool.

Figure 10B:
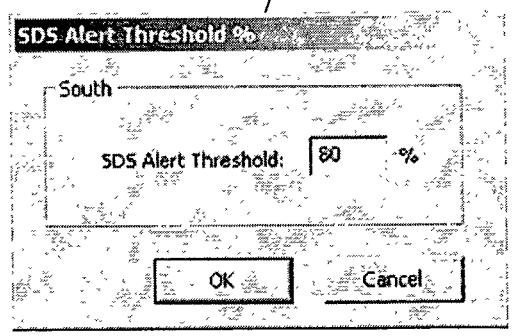

Various interfaces may be used to create the storage pool. One example resides within a SAN manager based interface and is prompted by pressing a "managed volumes" tab, which displays all pools of storage for all SDS in the relevant SAN. The pools can be displayed using a conventional file folders based interface that has a root pools folder for each SDS. Creation of the storage pool is initiated by a conventional mouse right click operation on the pools folder for any SDS. Referring to FIG. 10B along with FIG. 1A, this prompts display of a "creating new pool" screen 1004, which allows entry of information such as the above described storage unit size. Additional entries such as names can be provided, but this simplified screen allows fast and easy creation of storage pools. Here, the pool would be named using a default scheme, and right clicking on the new default name could be used to invoke the above described pool settings screen (1002) to enter additional information as desired. Various other techniques can be used to create a storage pool, in lieu of right clicking on the pools folder. For example, while in the same mode, a pull down menu may offer selections including those pertaining to the creation of a storage pool.

Figure 1B:
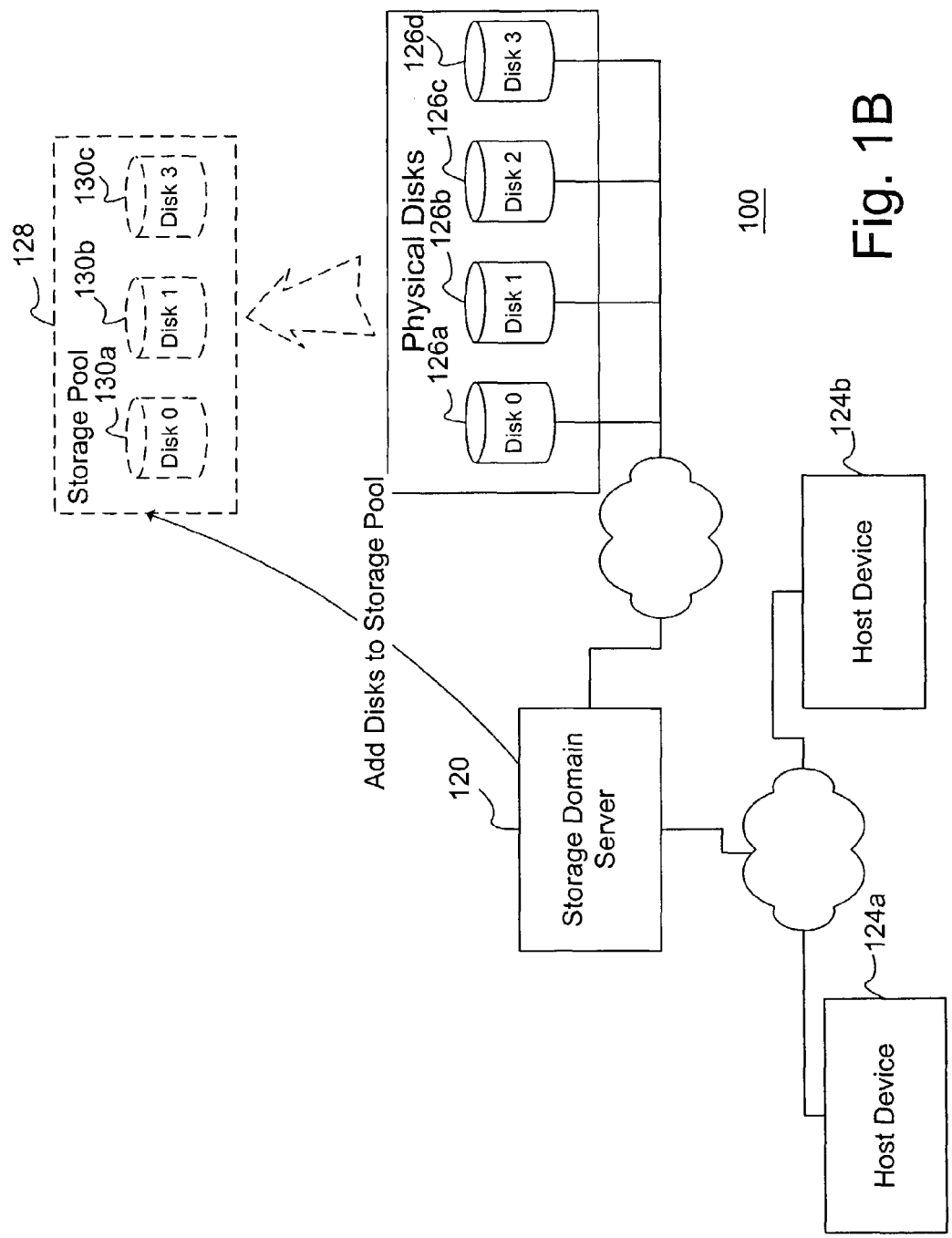

Referring now to FIG. 1B, once a storage pool has been defined, physical disks can be added to the storage pool. The physical disks are preferably displayable in a panel that concurrently appears with another panel containing graphical representations corresponding to the storage pools (e.g., folders, or other icons). Using mouse operations, a user can grab a given physical disk and move it into a desired storage pool to add the given physical disk to the storage pool, for example by holding the mouse button down and dragging the given physical disk into the appropriate folder or icon for the storage pool. The list of available physical disks is preferably limited to include only raw, un-partitioned disks, to allow efficient management of the available resources and allocation to the NMVs contained in the pool, although alternatives that involve additional management steps are also envisioned. As many physical disks may be added to the storage pool as desired. The storage pool will originate NMVs of the designated total size of the pool even if the collective size of the allocated physical disks is less (or even much less) than the designated size (e.g., 2 terabytes) of the storage pool. FIG. 1B reflects the addition of disks 0, 1, and 2 (130a-c) from the set of available disks into the previously defined storage pool.

Figure 10C:
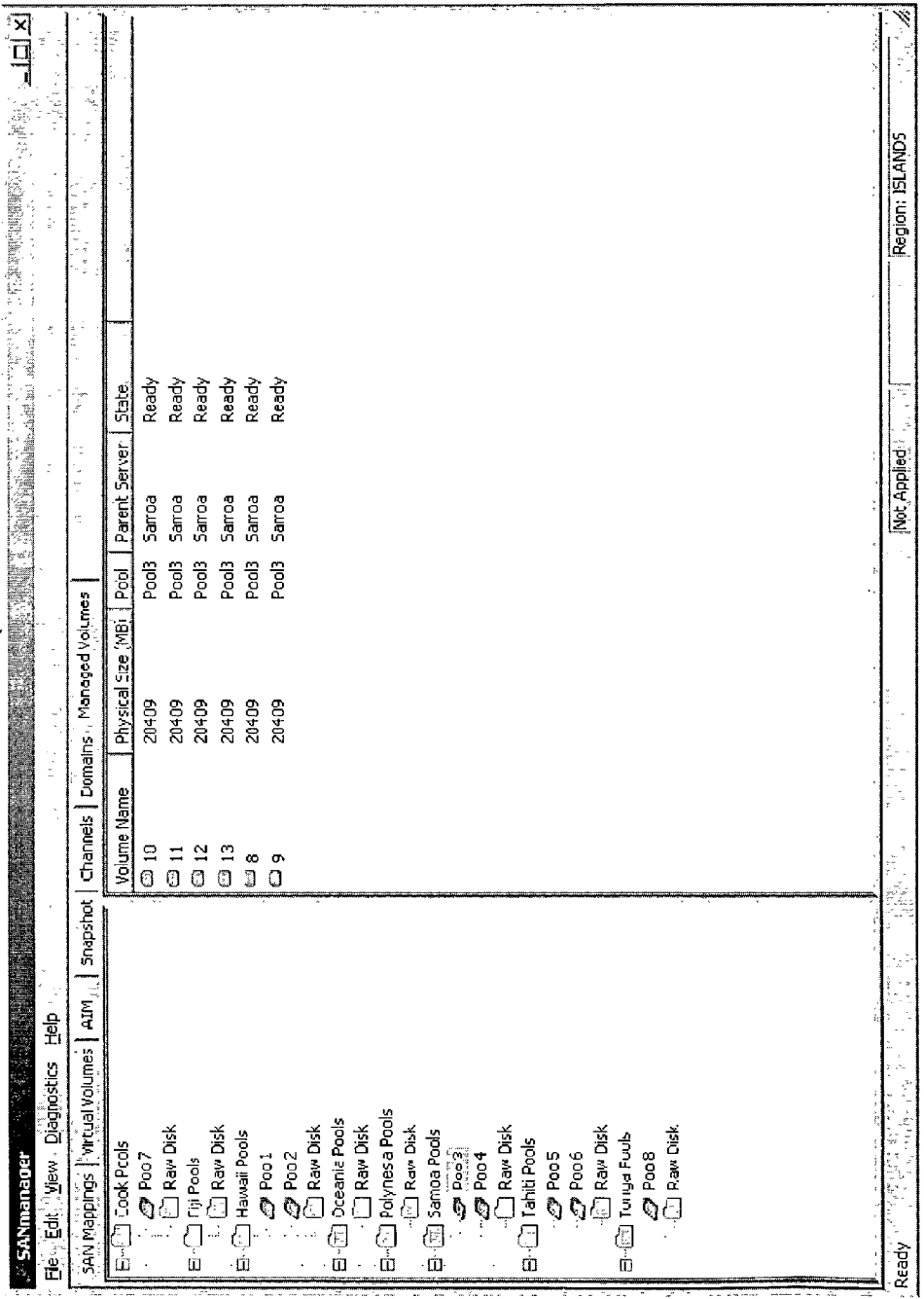

Referring now to the schematic diagram of FIG. 1C, NMVs 132a, 132b are then created based upon the storage pool. An example of the interface for creating a NMV is to right click on the relevant storage pool name, and to then select "Add Network Managed Volume" from a menu that appears, upon which a new NMV is added to the pool. Additional NMVs may be added under the pool name as desired. Although embodiments with various configurations are contemplated, preferably each NMV will have a default size that matches the size of the storage pool (e.g., 2 TB), regardless of the actual storage capacity of the disks that have been added to the pool. These NMVs can be assigned and presented to host devices in the SAN. A host device will perceive and interact with a NMV as though it was a physical disk, without concern as to which physical disks are actually associated with the NMV through the storage pool. Referring to FIG. 10C along with FIG. 1C, an example of an interface 1006 for displaying pool and volume information includes a left panel that displays the pool names and a right panel that details the NMVs within that pool. These details might include the volume name (here, numbers (8-13) are used, but names could vary), physical size, corresponding storage pool, relevant server, and state information. A user navigates to these panels by clicking on a tab, such as the shown "Managed Volumes" tab. Pools 3 and 4 are shown to reside in the Samoa Pools category. Clicking on a pool in the left panel, such as pool 3, causes the right panel to update to include details for the NMVs defined from the selected pool.

Procedures for allocating physical storage space and issuing alarms to request additional storage space are provided below. Generally, the storage pool is conceptually divided into a number of chunks having the chunk size, and the NMVs that are assigned to the storage pool are variously mapped to those chunks. Although the NMVs are presented as large disks having the total capacity of the storage pool, they don't necessarily have the same amount of physical storage allocated to them at all times. Instead, physical resources are allocated to NMVs based upon actual demand. Preferably, the physical disks that are contained in a storage pool are divided into physical chunks that also have the chunk size. When need arises (e.g., a write operation to an NMV that requires more physical storage than is currently allocated to the NMV), a physical chunk is allocated to the storage pool (and thus the NMV). A mapping is maintained between the physical resources and the virtual resources (the storage pool and its NMVs). Although the chunk size can be any size, one suggested default size is 128 Mb. At the time that a pool is created, it may be useful for the administrator to consider the intended use of the pool. A lower chunk size allows lower incremental physical storage space consumption, since only the (relatively small) chunk size will be allocated upon incremental demand. A larger chunk size entails less computational overhead in managing the system (e.g., more frequent updates to the mapping of physical chunks to NMVs, etc.), but has relatively higher incremental physical resource consumption (i.e., allocating a large chunk consumes more physical storage than allocating the relatively smaller chunk). Thus, if the intended users will be making many large write requests, it will likely be desirable to use a larger chunk size, but if intended users will be making small write requests, or random, periodic writes, it may be more desirable to user a smaller chunk size.

Figure 2A:
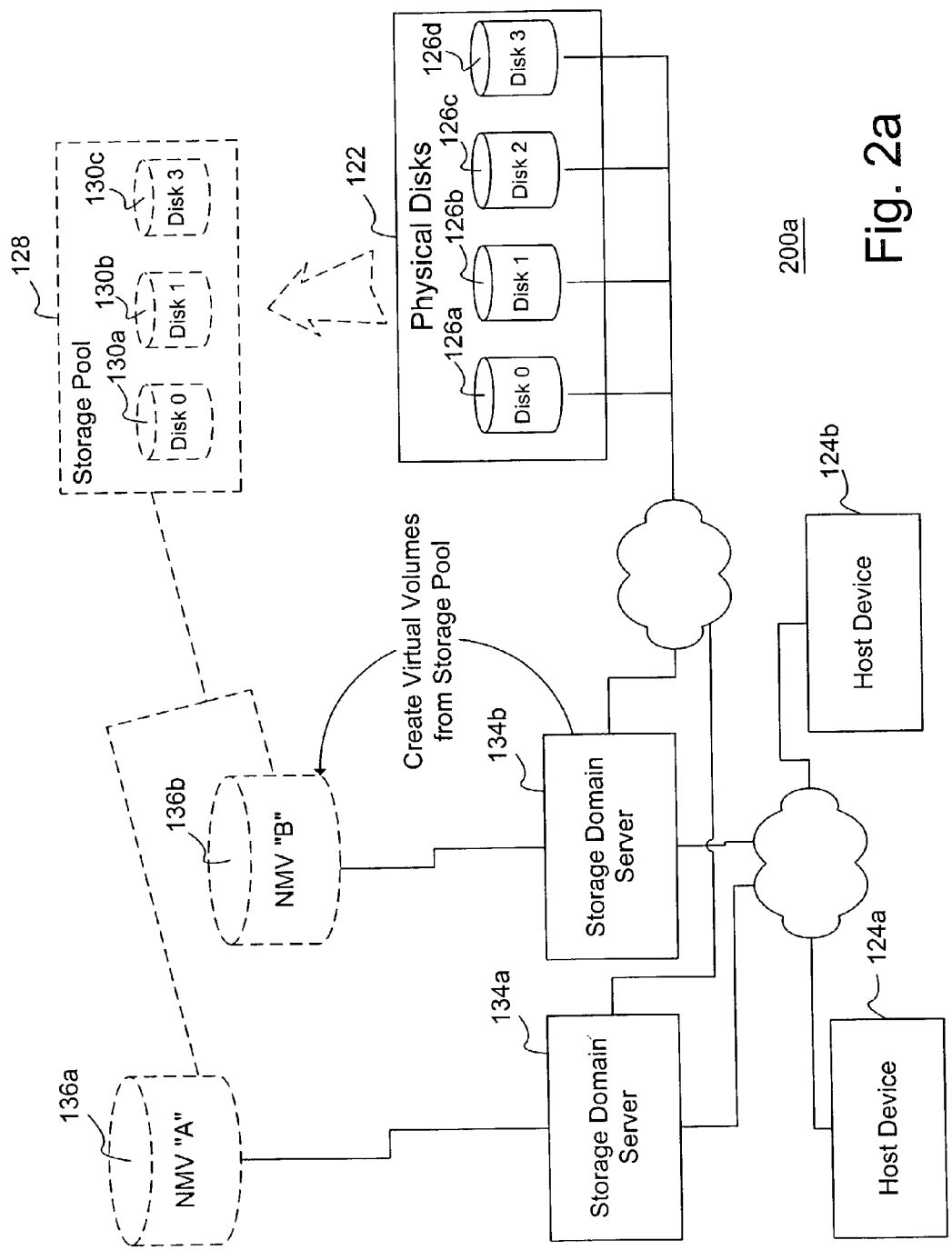
FIG. 2A is a schematic diagram illustrating a SAN with multiple storage domain servers managing multiple virtual volumes from a common storage pool.
Figure 2B:
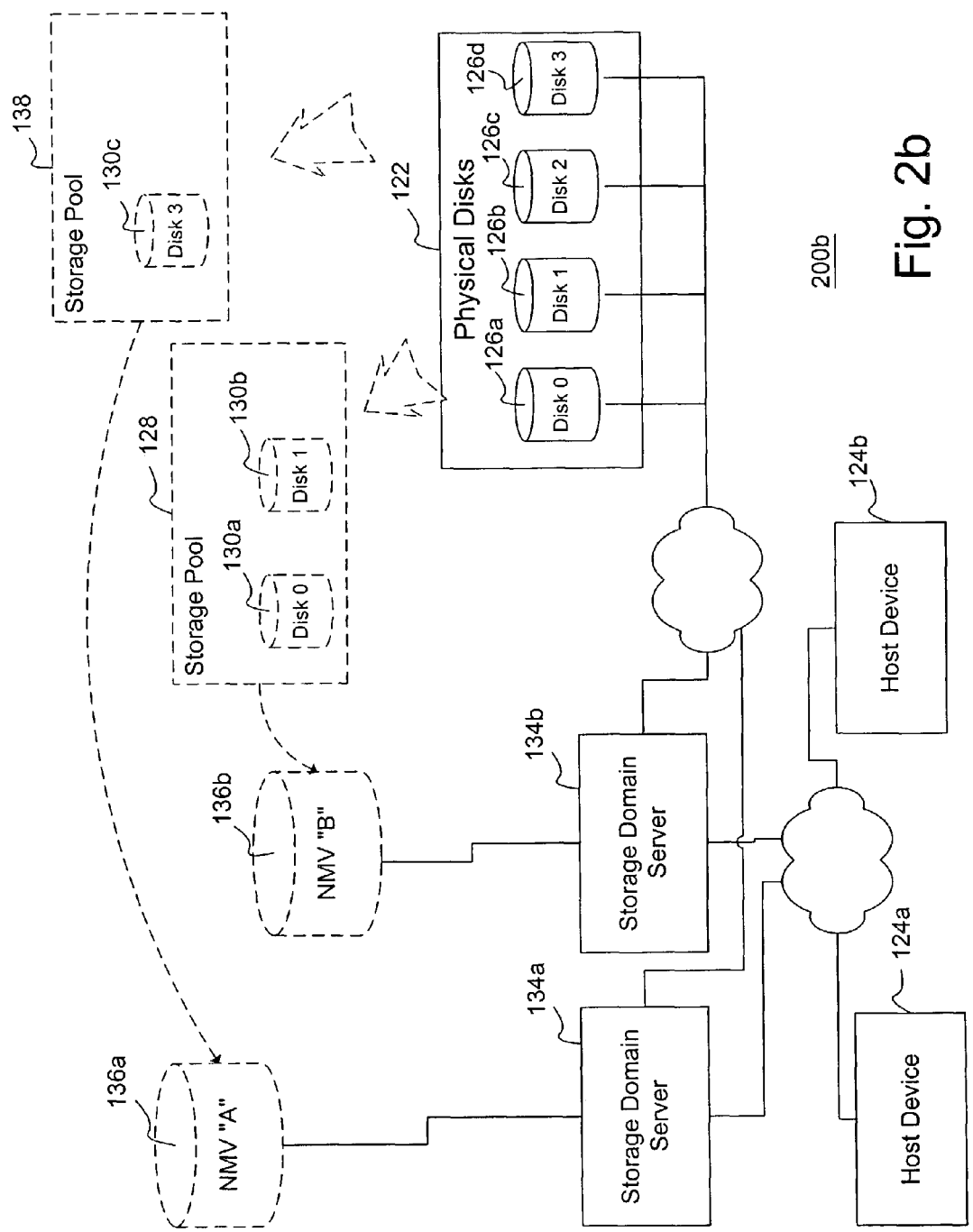
FIG. 2B is a schematic diagram illustrating definition of multiple storage pools in a SAN, and separately populating the storage pools from a pool of available physical disks.

Another aspect of the present invention allows multiple storage domain servers to manage NMVs that are contained by the same storage pool. The procedures for performing operations on NMVs, and coherently managing the allocation of physical storage space to the NMVs are described further with reference to FIGS. 4-8 below. Additionally, with reference to FIG. 2A, a SAN 200a may include a first SDS 134a and a second SDS 135b that separately manage first and second NMVs 136a, 136b. As described above, a protocol such as the FC protocol connects the host devices 124a, 124b to the SDS 134a, 134b. A unique identifier (e.g., WWN based, or MAC address, etc.) corresponds to each interface through which any of these devices communicates according to the protocol. Additionally, a host device can assign a logical unit number (LUN) to a volume. Thus an information triplet comprising the host device interface identifier, SDS interface identifier, and LUN number can be associated with a particular NMV. For example, host device 124a may have NMV "A" 136a as its LUN 0 through SDS 134a. The unique identifier for the host device and itself, and the indication LUN 0 is enough information for the SDS 134a to correlate I/O operations between host device 124a and NMV "A" 136a, even in a multiple host device, multiple SDS, multiple NMV environment. FIG. 2B illustrates the definition of multiple storage pools 128, 138 in a SAN 200b. This allow an administrator to craft a first storage pool for a first group of users, and a second storage pool for a second group of users. The attributes, including the size of the storage pool, as well as the alarm settings, can be tailored to the particular group. FIG. 2B also illustrates the population of the storage pools from the same pool of available physical disks, as well as the reassignment of one physical disk 130c from one storage pool 128 to another storage pool 138.

Figure 3:
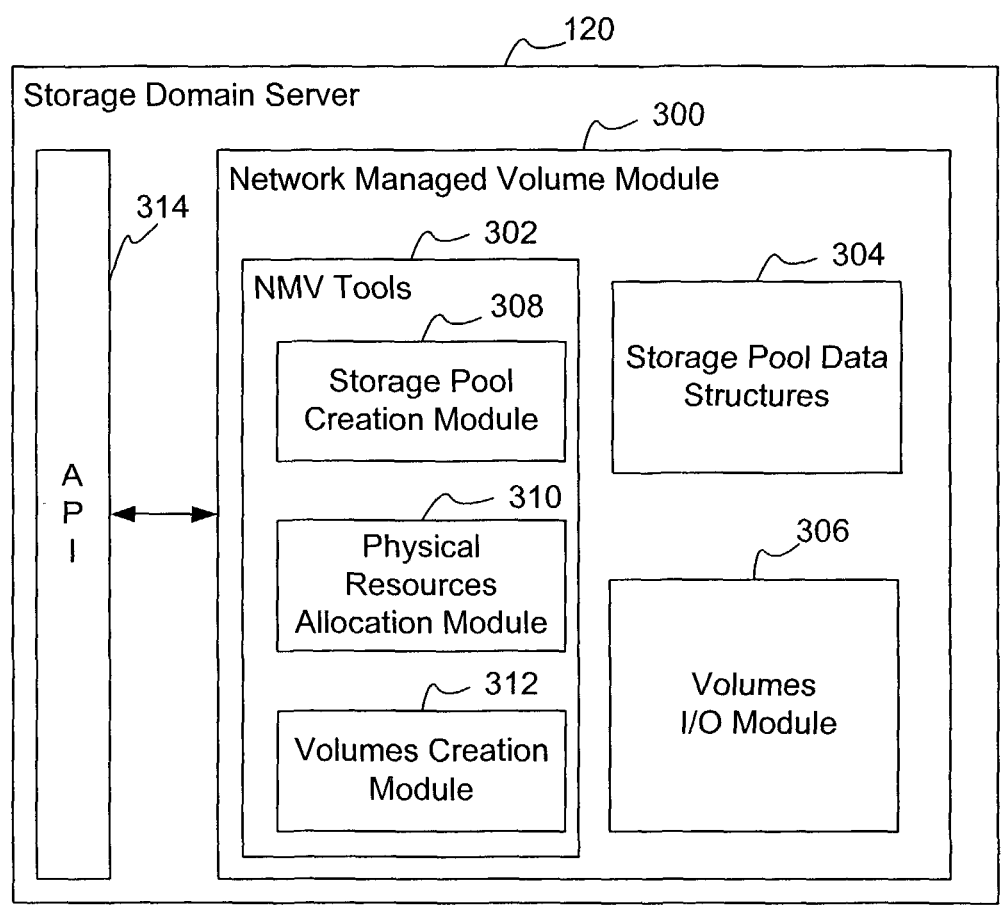
FIG. 3 is a block diagram illustrating an embodiment of a module for providing network managed volumes functionality in accordance with the present invention.

The block diagram of FIG. 3 illustrates a network managed volume (NMV) module 300 in accordance with the present invention. It is shown within an SDS 120, and may also invoke an operating system, such as Windows 2000. The functionality can be represented in the form of software that may be stored on various media, like floppy disk, CD-ROM, etc. In the operating environment, the software can reside in memory, and will of course include instructions that, when executed by a processor, effectuate the network managed volumes functionality described herein. The NMV module 300 is shown to include an NMV tools module 302, storage pool data structures 304, and a volumes I/O module 306. The NMV tools module 302 includes a storage pool creation module 308, a physical resources allocation module 310, and a volume creation module 312, which respectively include instructions for providing interfaces and receiving corresponding information that is used to create storage pools, adjust the designation of physical disks to the storage pools, and associate NMVs with the storage pools. The NMV tools module 302 may also provide the user interface that illustrates the overall mapping of the SAN in a multiple SDS environment, and navigation among the resources contained therein. Conventional windows based interfaces and folder operations, which are populated and which function according to the description herein, can be used to implement the functionality of the NMV tools module 302.

Each storage pool will have an underlying data structure that is preferably retained by the SDS and replicated, at least in part, on every physical disk in the storage pool (and may also be replicated on other storage domain servers where applicable). Preferably, the storage pool data structure will be small enough to allow for very large numbers of disks to be handled without significant memory overhead, will be simply arranged to minimize the risk of corruption and inconsistency, and will incorporate a unit mapping size that will be reasonably large, so as to reduce the size of the required data structures and minimize the impact of performance overheads. The NMV is mapped as a sparse array, with no requirement for contiguous use, which allows multiple NMVs to correspond to a given storage pool, as will be understood from the mapping discussion below. The NMV module 300 generates these data structures and maintains and stores them as the storage pool data structures 304. Detailed data structures defining a storage pool and its constituents, as well as initialization data structures compiled from the detailed data structures are provided and managed by the NMV module 300. These data structures are described further below with reference to FIGS. 4-5.

The virtual volumes I/O module 306 manages the read and write operations between a relevant host device and NMV. Read and write accesses operate upon a chain of "chunks" in a chunk table that corresponds to the NMV. These virtual chunks are also correlated to chunks mapped to physical disks. Generally, read and write access is sought by using previous allocations of physical disk chunks to the NMV chunk table. If a write operation requires more than was previously allocated, a new chunk from the physical space is allocated and linked to the chain of NMV chunks. Read operations that extend beyond previous allocation will return zeroes.

In addition to the chunk allocation functionality, a cache can be used to provide performance optimization. Particularly, the main memory that resides on the SDS stores NMV content in a cache. Performing I/O operations through the cache reduces latencies associated with I/O operations to the physical disks. The amount of memory allocated for the cache can be based on factors such as the amount of physical memory on the SDS, and the amount of physical storage allocated to the NMV. The cache can also have built in read optimizations that are applied on a per volume basis. Particularly, a portion of the NMV is retained in the cache. When a read operation is received, it is determined whether it can be completely satisfied by the cache. If not, the operating system may be queried to read data in from the corresponding physical disk. Write coalesced back and write optimizations, wherein a series of small writes are accumulated to provide an overall larger write, can also be provided. All of these operations are synchronized with the network managed volume functionality, which implements the chunk-based allocation of physical storage space and corresponding chunk table for the NMV, described further below. In addition to providing for read and write operations, the NMV module 300 provides alarms based upon physical resource consumption. The alarm, write and read operations are described further below with reference to the flow diagrams of FIGS. 7-9.

Figure 4:
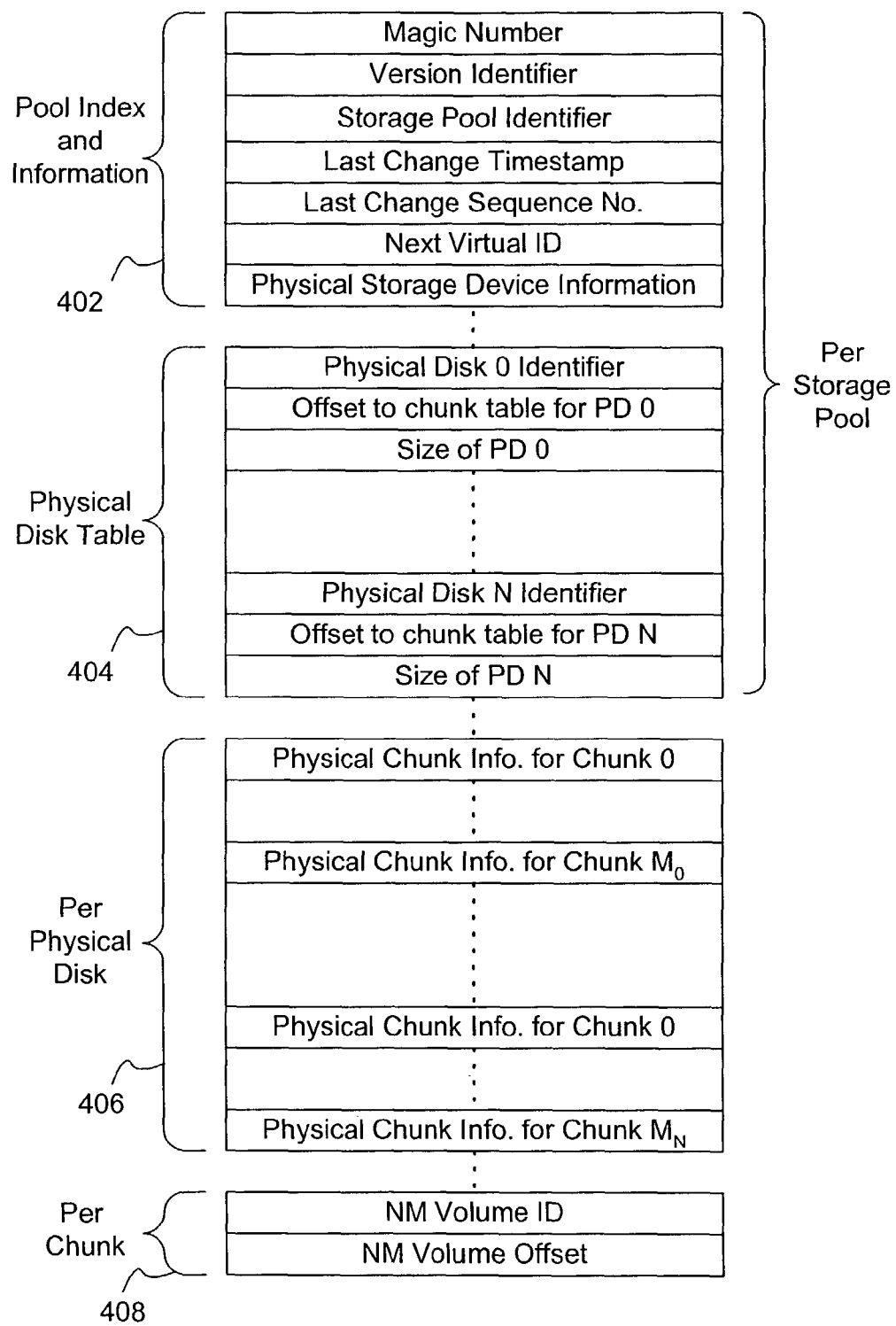
FIG. 4 is a block diagram illustrating an embodiment of a data structure for a storage pool in accordance with the present invention.

The block diagram of FIG. 4 illustrates an embodiment of a storage pool data structure (SPDS) 400 in accordance with the present invention. The SPDS 400 may also be referred to as an allocation map. Generally, the SPDS 400 is used to organize the association of physical disks to storage pools, and physical disks within the storage pools to pieces of the NMV to which they are allocated. Preferably, physical storage is allocated to the NMV on a need basis, which substantially reduces necessary physical memory requirements to present relatively large NMVs to host devices. Also preferred is a "chunk" based allocation of physical storage to the NMV. Each storage pool is divided into reasonably sized chunks, such as on the order of several hundred megabytes, although any size may be provided dependent upon system and demand requirements. Preferably, an association is maintained for each physical chunk indicating which NMV it is mapped into and the virtual offset at which it appears. For a terabyte of physical storage with a chunk size of 128 Mbytes this will require about 8192 associations. The SPDS 400 also indicates which physical chunks are allocated to which NMVs, and which available physical chunks are not yet allocated. The allocated chunks assemble into a chunk table that corresponds to the NMVs in the data storage pool. The chunks for each individual NMV can be assembled as a chain of chunks, using a series of pointers to "next" chunks, as described further below. The chunks collectively provide the storage that comprises the NMV.

Still referring to FIG. 4, the SPDS 400 includes sections for a pool index and information 402, a physical disk table 404, a per physical disk region 406, and a per chunk region 408. The information in the first two regions 402, 404 is provided on a "per pool" basis. The information on the per physical disk region 406 is provided for each physical disk, and the information in the per chunk region 408 is provided for each physical chunk. Preferably, the content of the data pool data structure is generated by the NVM module 300 introduced above, and is retained in each operating SDS in the SAN, as well as every physical disk in the storage pool. For upgrade purposes, it is desirable, but not necessary, to reserve an area for the data structure 400 that is significantly larger than the amount of storage space it currently uses. Although the SPDS 400 is shown as a contiguous entity, the same data and corresponding functionality can be provided through non-contiguous or other methods of maintaining similar data. For example, an array of information can be included sequentially in contiguous form within the SPDS, or a section in the data structure can merely point to a location identifying the start of the array of information, with the array then pointing back to the data structure 400 at its end. The artisan, once instructed in accordance with the description herein, will understand these and other alternatives for the SPDS 400.

The pool index and information 402 section generally includes information that identifies the SPDS 400 as a storage pool data structure, some general information about the physical storage devices associated with the SPDS 400, and entries that accommodate for future updates. This embodiment includes entries called "Magic Number," "Version Identifier," "Storage Pool Identifier," "Last Change Timestamp," "Last Change Sequence No.," "Next Virtual ID," and "Physical Storage Device Information."

The Magic Number is a number that can be used to confirm that the block of data is an index for an SPDS 400. Any type of number that uniquely identifies the block type can be implemented. The Version Identifier indicates the version or format of the SPDS 400 that corresponds to the index. This can be used to accommodate updates wherein other portions of the data structure change, or backwards compatibility. The storage pool identifier is preferably a large number that uniquely identifies the storage pool. Each storage pool can be given this ID upon creation. Various numbers can be used such as the previously described UUID. Each NMV within the storage pool will also be given a unique 32-bit ID that will be unique within the pool. These will start at a given number (e.g., 1) and will be incremented for each new volume that is created from the storage pool. Each NMV on a SAN can then be uniquely represented by a combination of the Storage Pool ID and the Virtual Volume ID. This will be true even if the SAN manages multiple storage pools. With a starting number of 1, and a 32 bit Virtual Volume ID, this allows 4096 million NMVs to be created for a storage pool before the system cannot handle additional ones.

The Last Change Timestamp and the Last Change Sequence Number are used to identify the most recent copy of the SPDS 400 as it updates to effect changes and allocations. Preferably, the Last Change Sequence Number is a 64-bit number. With this size number, even if updates occur at 1 ηsec intervals it will take over 500 years for the Sequence Number to wrap. With this information, if the system goes down, a simple comparison of the timestamp information for the SPDS 400 on the various physical storage devices will indicates which version of the SPDS 400 was updated most recently. This version can then be used for initialization purposes and can be replicated on all of the storage devices as the current version upon reboot or start up. The Next Virtual ID is the next sequential number to be assigned to a newly created NMV. This updates when a new volume is created, and also indicates how many NMVs have already been associated with the SPDS 400 (one less than the value of the Next Virtual Volume ID). Finally, some physical storage device information, such as an array that indicates the physical structures that are allocated to the storage pool, can be provided if desired.

The physical disk table 404 is an array that provides physical disk identification and information on individual physical disk chunk tables that are used to identify where chunks of physical storage are placed on the physical disk. Information for each of "N" physical disks is included in the physical disk table 402. Preferably, each physical disk ID uniquely identifies the disk across all storage domain servers in a SAN. The seven byte "extended disk signature" that is provided by Windows 2000 can be used for the ID, as could various other unique identifiers. The "Offset to Chunk Table" identifies the chunk table location for each physical disk in the array. The "Size of PD" field identifies the number of blocks available for storage. If this is not a multiple of the chunk size, then surplus blocks of storage beyond the used number of chunks will be ignored.

Preferably, the chunks on a physical disk are sequentially stored starting at the first usable location, although various other arrangements can be provided, including non-sequential storage. The advantage of this arrangement is simplicity, particularly regarding initialization procedures, as it will be readily known where each physical chunk will reside. As indicated above, each physical chunk has an indication of which NMV it belongs to (0 for unassigned, sequential numbers that correlate with the number of defined NMVs at increments thereafter), as well as the virtual offset at which it appears. On a chunk by chunk basis, this can be referred to as "physical chunk information." Each "physical chunk info" entry includes the NMV ID and offset information.

Preferably, each physical disk retains this physical chunk information for all of the chunks in its domain. The "per physical disk" region 406, together with the "per chunk" region 408, identifies the physical chunk information for all chunks in all physical disks for the storage pool. Basically, for each physical disk, physical chunk information is obtained for each of N chunks on the disk. This can be represented as an array wherein each of N physical disks (disks 0-N) includes a number of chunks $M_{0-N}$, providing the overall array of physical chunk information as shown. Since each SPDS 400 will store all of this information, the SPDS 400 for any given physical disk can be accessed to discover all of the physical chunk locations in the pool.

The physical chunk information comprises what is shown in the "per chunk" region 408. This includes the Virtual Volume ID, described previously, which identifies the NMV to which the chunk has been assigned, with a value of zero indicating a free chunk. It also includes the Virtual Volume Offset identifies the chunk offset within the NMV at which the physical chunk appears. Each physical chunk on the physical disk has this associated information.

One way of ensuring reliability will be to synchronously write the SPDS 400 to every physical disk in the storage pool whenever the SPDS 400 is updated. Various techniques can be implemented to decrease the performance overhead required, particularly where frequent updates such as mapping a new chunk. For example, the SPDS 400 could be updated on a limited number of physical storage devices in the pool before allowing a state changing event to proceed. For example, a write that requires a new chunk allocation could proceed once at least two disks in the storage pool are updated with the new SPDS 400. Finally, if a disk fails, each disk in the pool can be marked as failed, or alternative recovery mechanisms can be provided.

The SPDS 400 need not be exactly as indicated in this embodiment, and can include more or less information as needed. For example, a "block size" that indicates the smallest transfer size that all devices within the storage pool can handle could be included and used to ensure appropriate alignment of data within the SPDS 400.

Figure 5:
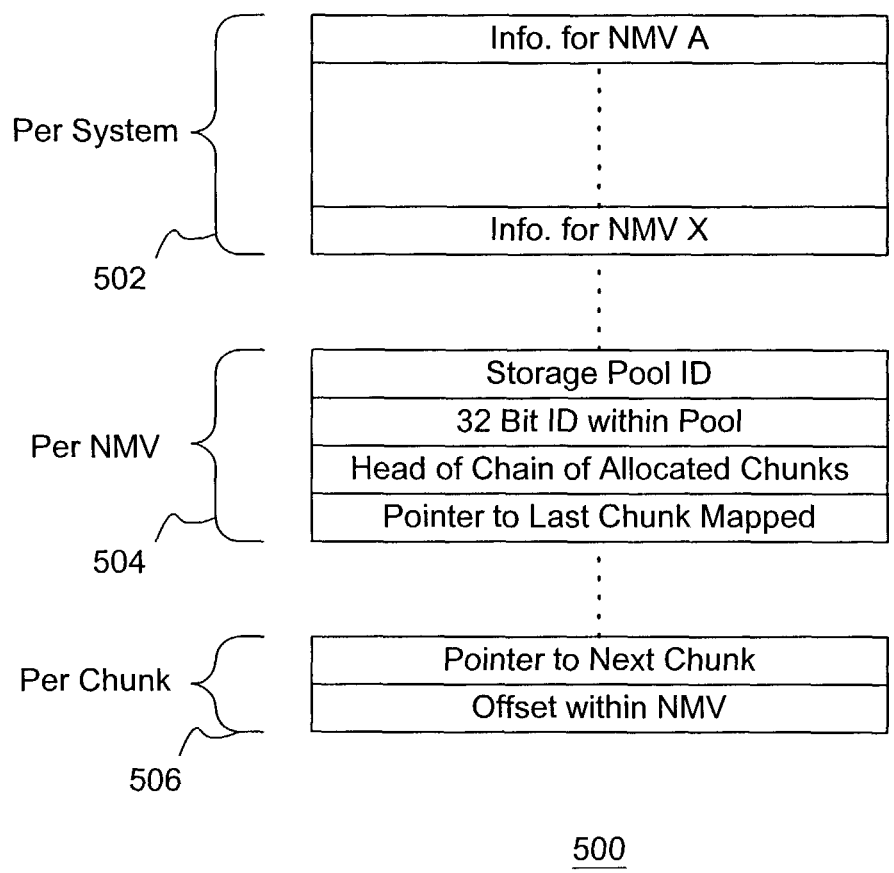
FIG. 5 is a block diagram illustrating an embodiment of a data structure that facilitates storage pool initialization in accordance with the present invention.

At system initialization time the data structure for the storage pool will desirably be read and converted into an in memory version. Some form of in memory data structures corresponding to the storage pool and the physical disks could also be provided for ease of manipulation. FIG. 5 is a block diagram illustrating an embodiment of a storage pool initialization data structure (SPIDS) 500, which includes "per system" 502, "per NMV" 504 and "per chunk" 506 sections.

The system 502 section contains information for each of the NMVs contained within the storage pool. They are shown as "A" through "X" but there could be any number of NMVs, as described previously. The NMV 504 and chunk 506 sections combine to provide mappings for each NMV that are conceptually identified as a chain of the chunks that have been allocated to the NMV. Particularly, the Storage Pool ID and 32 Bit ID uniquely identify the NMV, and for that NMV the head of the chain and the last chunk mapped are identified. Then for each chunk within the NMV, Pointer and Offset information completes the chain.

A free list of unallocated chunks will also be used to manage disk operations, as will be described below. This can be built at system initialization time by checking for unallocated chunks. A simplified version will use a sequential list, such that the first item on the list is nearest to the start of the first chunk and the first disk, and so on. Alternatively, load balancing could be implemented by building the list so as to interleave spindles, etc. The artisan will recognize the various alternatives.

As with the SPDS 400, the SPIDS 500 need not be exactly as indicated in this embodiment, and can include more or less information as needed.

Figure 6:
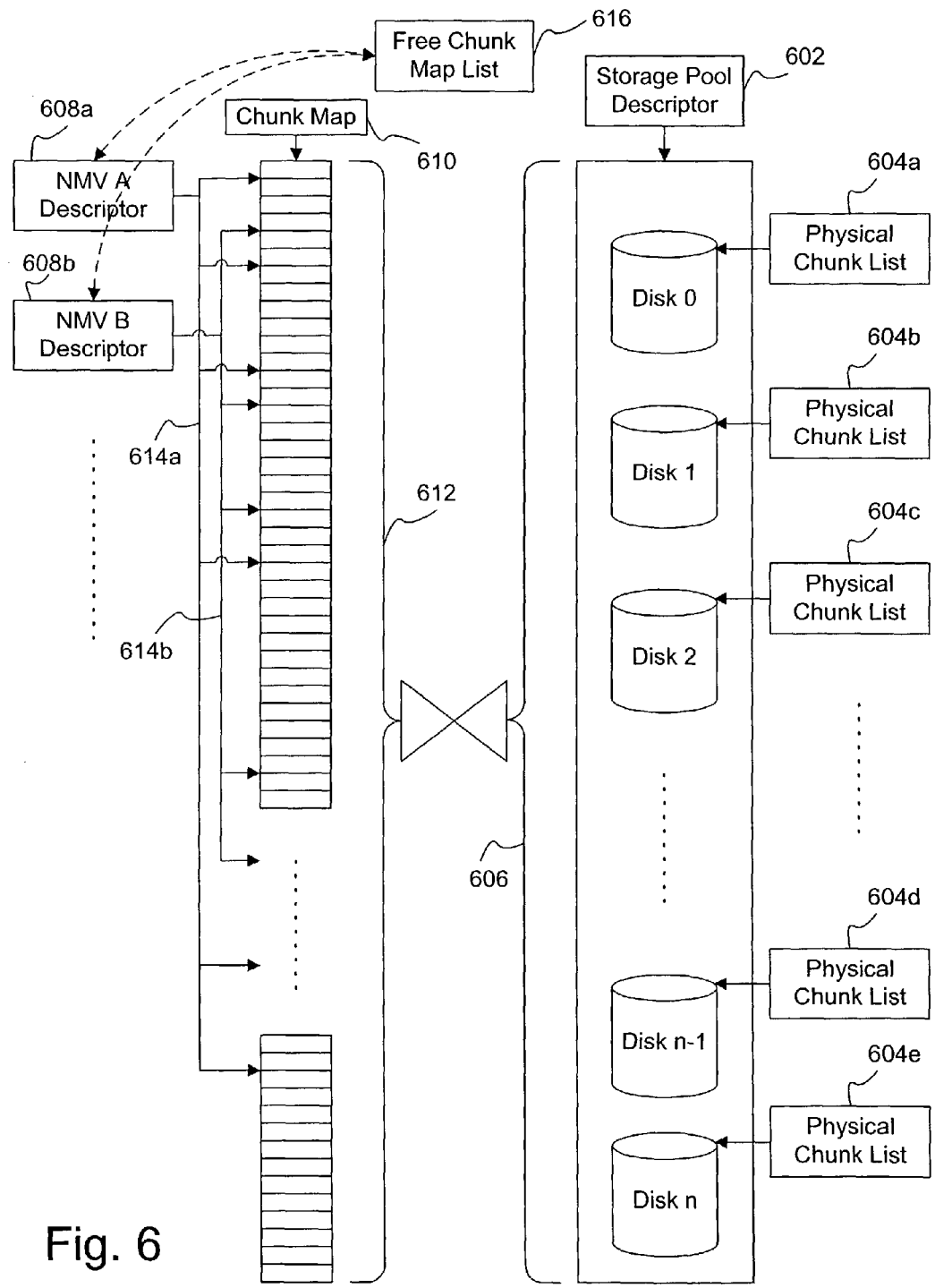
FIG. 6 is a schematic diagram illustrating the mapping and allocation of chunks of physical storage to virtual volumes in accordance with the present invention.

FIG. 6 is a schematic diagram illustrating the mapping and allocation of chunks of physical storage to NMVs in accordance with the present invention. Generally, the chunk map 610 can be thought of as containing two types of "threads" of chunks, each having the chunk size. The first type is the a thread that defines all of the chunks in the storage pool as denoted by bracket 612. Additionally, there is a second "thread" for each NMV defined by the storage pool. These are described further below.

Looking at the physical side of the mapping (the right side), the storage pool data structure provided by the SPDS provides a storage pool descriptor 602 that identifies all of the physical disks (Disk 0 through Disk N) that have been placed in the storage pool. Each disk is divided into a number of physical chunks each having the chunk size. These chunks do not have be all be immediately allocated to the storage pool, but rather can be allocated as needed. The physical chunk lists 604a-e are established by the previously described SPDS. The physical chunk lists indicate where chunks are located on the physical disks. Also, for each chunk, and indication of the corresponding NMV and the virtual offset at which they appear allows both initialization of the NMVs, as well as mapping the physical chunks to the virtual chunk map 610. As indicated, the chunk map 610 corresponds to the chunks that are collectively found within the physical disks allocated to the storage pool, as indicated by brackets 612 and 606. Also shown in the figure are descriptors for NMV "A" 608a and NMV "B" 608b, as well as the pointers to appropriate locations in the chunk table, respectively shown by arrows 614a for NMV "A" and 614b for NMV "B." The descriptors 608a, 608b define the previously described chain of chunks for each of the NMVs, which can also be referred to as the "threads" that define each NMV. Although two NMVs are shown, there can be tens, hundreds, thousands or more NMVs as previously described, which would each have a chain of chunks within the collective chunk mapping. Finally, the free chunk map list 616 contains the previously described free list of unallocated chunks. These chunks will be used as needed for I/O operations, etc. When a new chunk is allocated to a NMV, the descriptor for that volume updates to reflect the addition of the new chunk (and the SPDS is updated).

The above described mappings and allocations allow an SDS to handle I/O operations by host devices to NMVs created from storage pools. Additionally, the amount of physical storage allocated to the storage pool, the amount collectively consumed by allocation to NMVs in the pool, and previously described threshold levels can be used to allocate disks to a storage pool or to prompt alerts that indicate that more physical disks are needed in the storage pool.

Figure 7:
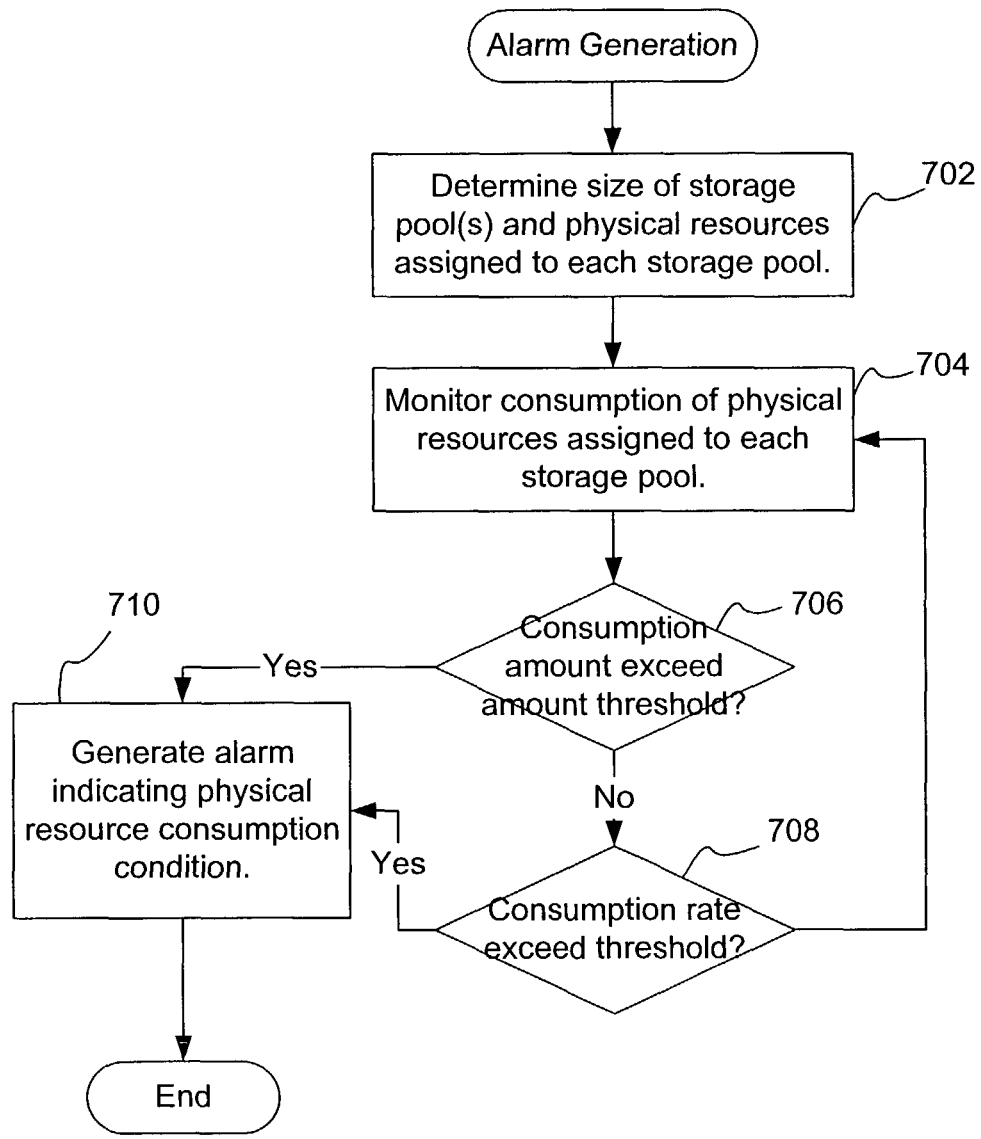
FIG. 7 is a flow diagram illustrating an alarm generating procedure in accordance with the present invention.

FIG. 7 is a flow diagram illustrating an alarm generating procedure in accordance with the present invention. Generally, alarms are provided based upon a comparison of allocable physical resources against what has already been allocated. These alarms can be generated based upon various criteria including the total amount of consumed resources or the rate at which resources are being consumed. Additionally, since the present invention allows the management of multiple storage pools within a SAN, various storage pools can each have individual alarm criteria. This allows, for example, a group of user who are expected to consume resources at a rapid rate to have a higher rate of physical resource consumption threshold than would a group expected to impose less demand on the system.

For each storage pool to be monitored, the size of the storage pool and the physical resources assigned to each storage pool are determined 702. Particularly useful is the amount of physical resources assigned to the storage pool. This is preferably implemented as the total number of chunks of physical storage that are allocable to NMVs or other virtual volumes defines from the storage pool. The term allocable is used, because, as described above, even where a physical disk has been designated to a storage pool, the actual physical storage is not allocated until it is determined to be required. For example, if 10 physical disks each including 10 physical chunks are in the storage pool, then there would be 100 chunks of allocable physical storage.

The amount of physical storage that is actually allocated, or the consumed physical resources, is also monitored 704 for each storage pool. This can also be defined in terms of chunks. For example, a user defining an NMV from the storage pool will typically allocate a physical chunk to the NMV, and subsequent writes that cumulatively exceed one chunk of storage will prompt allocation of another chunk, and so on, with multiple users potentially feeding off the same storage pool. The total number of chunks that have been actually allocated to the storage pool is therefore readily calculated. Various types of alarms can be provided. When it is determined 706 that the amount of consumed physical resources exceeds a threshold, an alarm indicating the physical resource consumption condition is generated 708. The preferred threshold is based upon a given percentage of the amount of physical resources allocated to the storage pool. For example, with the simple example given above, wherein 100 chunks of physical storage are assigned to the storage pool, if the user indicates an SDS alarm threshold of 80%, the alarm will be generated once the $80^{th}$ chunk is allocated. Of course, there are various alternatives to the above, and the determination whether the threshold has been exceeded does not have to be chunk based. Additionally, other types of thresholds, wherein a user enters a fixed number in lieu of a percentage, may also be provided.

Another preferred type of alarm is generated based upon the rate at which physical resources are consumed. This type of alarm may be helpful to an administrator in flagging problems, potentially well before a amount-based alarm would do so. When it is determined 708 that the consumption rate exceeds a rate threshold, an alarm is generated 710 indicating that condition. Although once again the rate may be variously calculated, determination of this alarm condition may also monitor chunk based physical resource allocated, as a function of time, to determine whether the rate has been exceeded.

Figure 8:
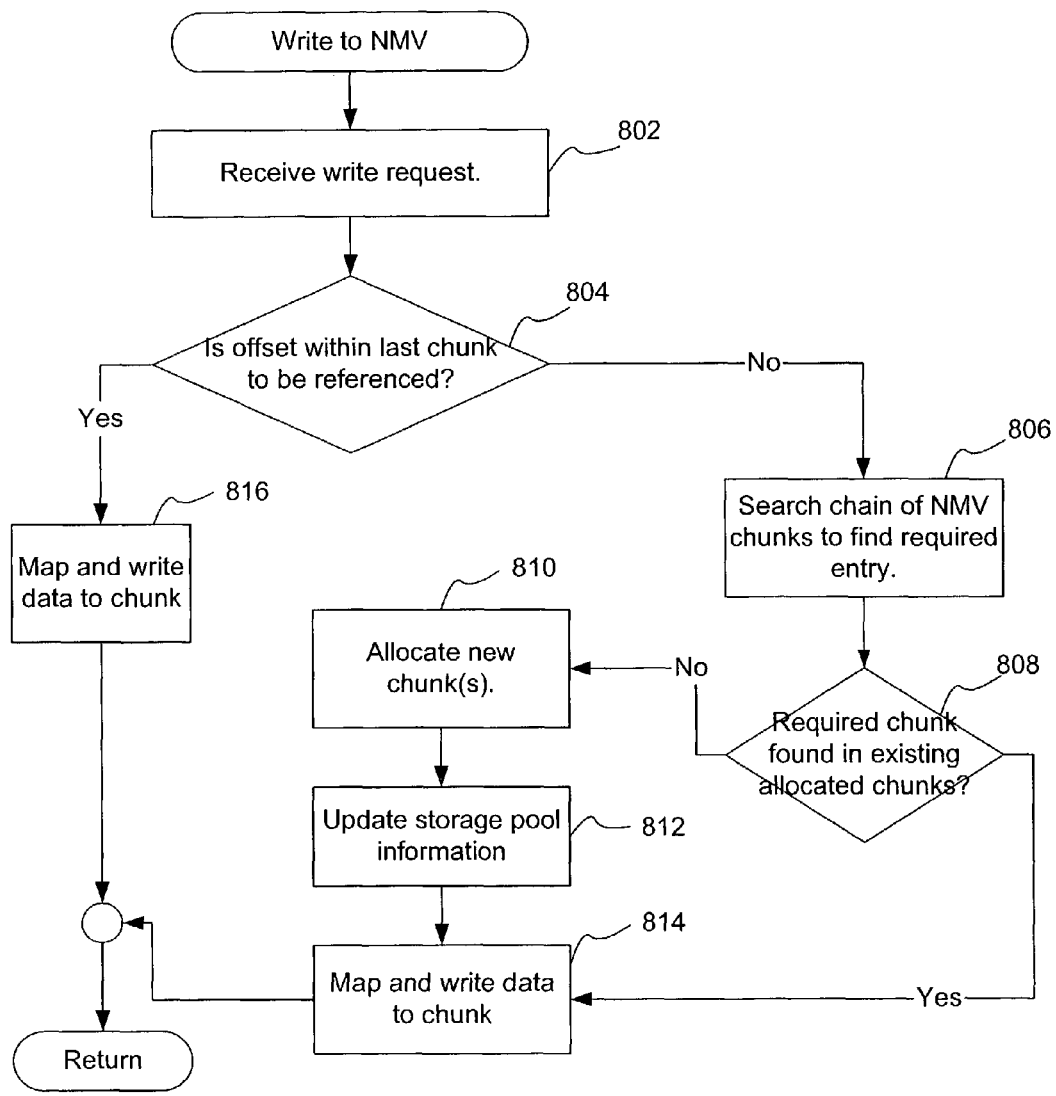
FIG. 8 is a flow diagram illustrating a write operation to a network managed volume in accordance with the present invention.

FIG. 8 is a flow diagram illustrating a write operation to a NMV in accordance with the present invention. As indicated, a write operation is received 802. Recognition of the write to the NMV by the SDS is accomplished such as by the interface identifier information and LUN number as described above. Before proceeding with the write, there may be an intervening check on the physical disks in the storage pool to determine whether there are enough physical disk(s) in the storage pool to handle all of the write data. Of course, an adequate response to the previously described alarms would prevent a situation wherein the storage pool would have inadequate physical resources. Note that an overall write may also be broken up into a number of smaller write blocks, and the procedure referenced in FIG. 8 may pertain to such a smaller write block belonging to a larger overall write operation.

Assuming adequate resources (or not, if such steps are not taken), it is then determined 804 if the current write offset is within the last chunk to be referenced. Determining whether there is currently enough space in a currently referenced chunk to handle the write can do this. If such is the case, then the mapping is basically already in place, and the data is written 816 to the appropriate chunk. If the write extends beyond the referenced chunk, then the chain of chunks allocated to the NMV is searched 806 to find the required chunk entry. If it is determined 808 that a currently allocated chunk can handle the write, then again the mapping is basically already in place, and the data is written 814 to the appropriate chunk or chunks. If it is determined 808 that such is not the case, then a new chunk or chunks is allocated 810 to the relevant NMV. This can be accomplished by securing a new chunk from the previously described free chunk list that correlates to physical chunks of storage. Once a new physical chunk is identified for allocation, the storage pool data structures are updated 812 to reflect the allocation, and data is written 814 to the newly mapped chunk or chunks.

Figure 9:
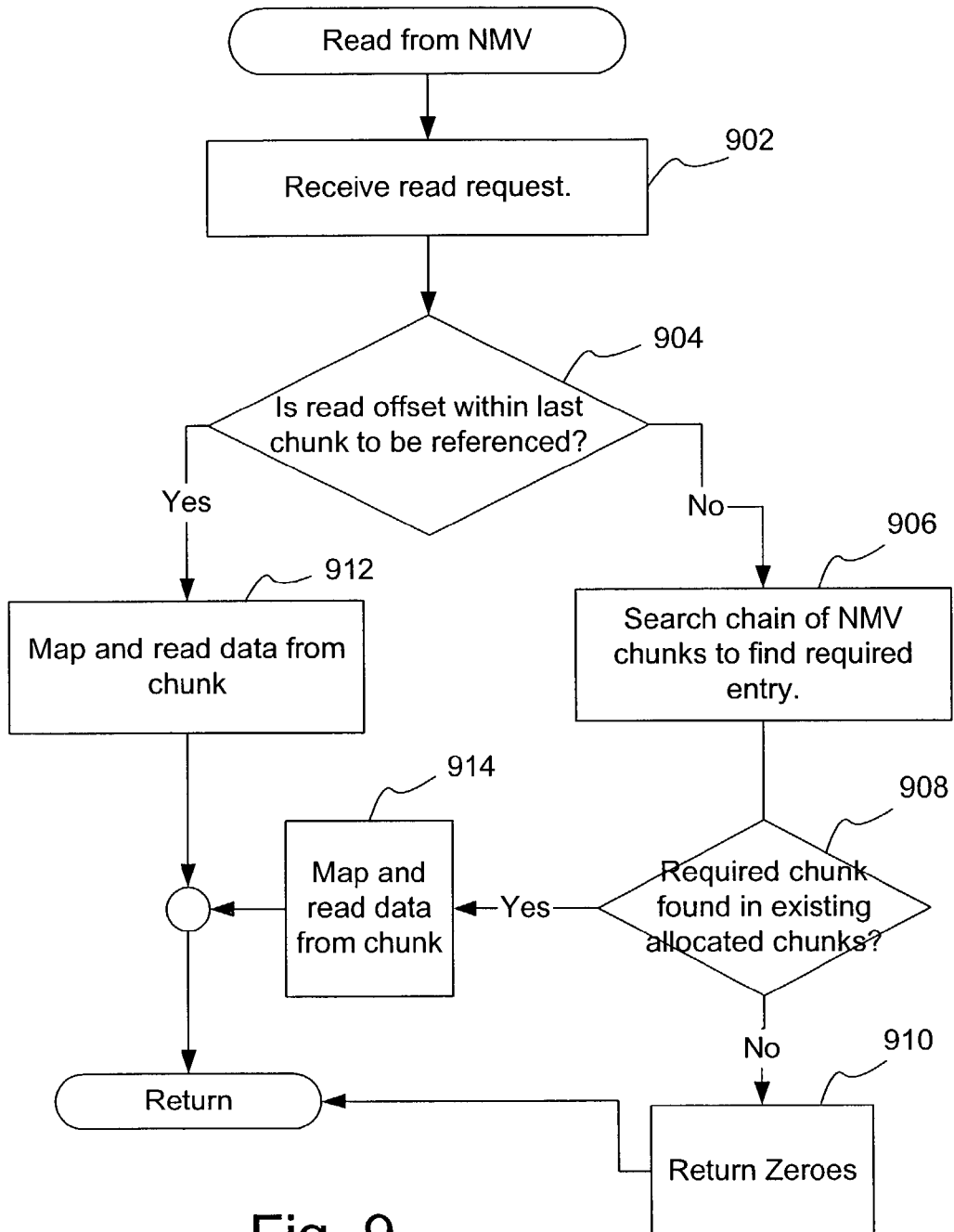
FIG. 9 is a flow diagram illustrating a read operation from a network managed volume in accordance with the present invention.

FIG. 9 is a flow diagram illustrating a read operation from a NMV in accordance with the present invention. Similar to the write operation, the read request is received 902 and recognized. Then, it is determined 904 whether the read offset is within the last chunk to be referenced. If so, the read is mapped according to the current configuration and is made from the relevant chunk (step 912). If not, then the chain of NMV chunks is searched 906 until the required entry is found. Upon a determination 908 that there is no such entry, zeroes are returned. When physical disks are allocated to the storage pool, they are preferably zeroed out. Since the chunk has not been allocated, it has not been written to, so it is appropriate to return zeroes. However, upon a determination 908 that the required entry is found among the existing chunk allocation, the mapping of the read is to the relevant chunk, and the data is read 914.

Although such is not necessary, the system can respond to a write of a long string of zeroes by not actually allocating the physical storage. Zeroes would still be returned for corresponding read operations, per the above. This allows the system to conserve physical resources, and may be useful for handling applications that attempt to secure huge amounts of physical storage prior to actually using the physical storage.

Thus, methods and apparatus for managing NMVs in a storage area network are provided in accordance with the present invention. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for managing virtual volumes, the method comprising:
   defining a storage pool to which one or more physical storage devices is assigned by selection from a plurality of available physical storage devices, the assigned physical storage devices having a total logical size;
   defining virtual volumes that are associated to the storage pool;
   presenting the virtual volumes to one or more client devices, wherein the virtual volumes have respective logical sizes, and the sum of the logical sizes for the virtual volumes intentionally exceeds the total logical size of the assigned physical storage devices, and wherein the virtual volumes are presented to the client devices without requiring the assigned physical storage devices to have been previously presented to any of the client devices;
   defining the storage pool to include a plurality of available chunks each having a chunk size, the chunk size differing from and being larger than a block size used for basic write requests received from the client devices for the virtual volumes, the defining of the storage pool to include the plurality of available chunks occurring separately from the presenting of the virtual volumes to the client devices; and
   allocating physical chunks of the chunk size from the plurality of available chunks that are included in the storage pool to dynamically allocate physical resources to the virtual volumes on demand;
   wherein managing the virtual volumes is performed independently of the client devices.

2. An apparatus for managing virtual volumes, the apparatus comprising:
   a processor; and
   a memory, the memory storing program code executable to perform operations comprising
   defining a storage pool to which one or more physical storage devices is assigned by selection from a plurality of available physical storage devices, the assigned physical storage devices having a total logical size;
   defining virtual volumes that are associated to the storage pool;
   presenting the virtual volumes to one or more client devices, wherein the virtual volumes have respective logical sizes, and the sum of the logical sizes for the virtual volumes intentionally exceeds the total logical size of the assigned physical storage devices, and wherein the virtual volumes are presented to the client devices without requiring the assigned physical storage devices to have been previously presented to any of the client devices;
   defining the storage pool to include a plurality of available chunks each having a chunk size, the chunk size differing from and being larger than a block size used for basic write requests received from the client devices for the virtual volumes, the defining of the storage pool to include the plurality of available chunks occurring separately from the presenting of the virtual volumes to the client devices; and
   allocating physical chunks of the chunk size from the plurality of available chunks that are includes in the storage pool to dynamically allocate physical resources to the virtual volumes on demand, and wherein managing the virtual volumes is performed independently of the client devices.

3. A computer program product, for managing virtual volumes, the computer program product comprising a non-transitory computer readable medium having program code stored thereon, which when executed performs operations comprising:

defining a storage pool to which one or more physical storage devices is assigned by selection from a plurality of available physical storage devices, the assigned physical storage devices having a total logical size;

defining virtual volumes that are associated to the storage pool;

presenting the virtual volumes to one or more client devices, wherein the virtual volumes have respective logical sizes, and the sum of the logical sizes for the virtual volumes intentionally exceeds the total logical size of the assigned physical storage devices, and wherein the virtual volumes are presented to the client devices without requiring the assigned physical storage devices to have been previously presented to any of the client devices;

defining the storage pool to include a plurality of available chunks each having a chunk size, the chunk size differing from and being larger than a block size used for basic write requests received from the client devices for the virtual volumes, the defining of the storage pool to include the plurality of available chunks occurring separately from the presenting of the virtual volumes to the client devices; and allocating physical chunks of the chunk size from the plurality of available chunks that are included in the storage pool to dynamically allocate physical resources to the virtual volumes on demand, and wherein managing the virtual volumes is performed independently of the client devices.

4. The method of claim 2, wherein additional physical storage devices are assigned to the storage pool after the virtual volumes associated with the storage pool have been defined and presented to the client devices, and wherein additional allocation of physical chunks to the virtual volumes is performed independently of the client devices.

5. The apparatus of claim 3, wherein additional physical storage devices are assigned to the storage pool after the virtual volumes associated with the storage pool have been defined and presented to the client devices, and wherein additional allocation of physical chunks to the virtual volumes is performed independently of the client devices.

6. The computer program product of claim 4, wherein additional physical storage devices are assigned to the storage pool after the virtual volumes associated with the storage pool have been defined and presented to the client devices, and wherein additional allocation of physical chunks to the virtual volumes is performed independently of the client devices.

7. The method of claim 2, wherein managing the virtual volumes is also performed independently of the physical storage devices.

8. The apparatus of claim 3, wherein managing the virtual volumes is also performed independently of the physical storage devices.

9. The computer program product of claim 4, wherein managing the virtual volumes is also performed independently of the physical storage devices.

10. The method of claim 2, wherein the chunk size is at least an order of magnitude larger than the block size.

11. The method of claim 2, wherein the chunk size is at least 128 Mb.

12. The apparatus of claim 3, wherein the chunk size is at least an order of magnitude larger than the block size.

13. The apparatus of claim 3, wherein the chunk size is at least 128 Mb.

14. The computer program product of claim 4, wherein the chunk size is at least an order of magnitude larger than the block size.

15. The computer program product of claim 4, wherein the chunk size is at least 128 Mb.

16. The method of claim 2, wherein the plurality of available chunks are represented in a sequence and dynamically allocating physical resources to the virtual volumes comprises allocating a non-contiguous series of chunks in the sequence.

17. The method of claim 16, wherein descriptors respectively corresponding to individual ones of the virtual volumes define the non-contiguous series of chunks.

18. The apparatus of claim 3, wherein the plurality of available chunks are represented in a sequence and dynamically allocating physical resources to the virtual volumes comprises allocating a non-contiguous series of chunks in the sequence.

19. The apparatus of claim 18, wherein descriptors respectively corresponding to individual ones of the virtual volumes define the non-contiguous series of chunks.

20. The computer program product of claim 4, wherein the plurality of available chunks are represented in a sequence and dynamically allocating physical resources to the virtual volumes comprises allocating a non-contiguous series of chunks in the sequence.

21. The computer program product of claim 20, wherein descriptors respectively corresponding to individual ones of the virtual volumes define the non-contiguous series of chunks.

* * * * *